(12) United States Patent
Valouch et al.

(10) Patent No.: US 11,892,279 B2
(45) Date of Patent: Feb. 6, 2024

(54) DETECTOR AND METHOD FOR DETERMINING A POSITION OF AT LEAST ONE OBJECT

(71) Applicant: trinamiX GmbH, Ludwigshafen am Rhein (DE)

(72) Inventors: Sebastian Valouch, Ludwigshafen (DE); Celal Mohan Oeguen, Ludwigshafen (DE); Robert Send, Karlsruhe (DE); Ingmar Bruder, Ludwigshafen (DE)

(73) Assignee: TRINAMIX GMBH, Ludwigshafen am Rhein (DE)

( * ) Notice: Subject to any disclaimer, the term of this patent is extended or adjusted under 35 U.S.C. 154(b) by 192 days.

(21) Appl. No.: 17/291,034

(22) PCT Filed: Nov. 4, 2019

(86) PCT No.: PCT/EP2019/080107
§ 371 (c)(1),
(2) Date: May 4, 2021

(87) PCT Pub. No.: WO2020/094572
PCT Pub. Date: May 14, 2020

(65) Prior Publication Data
US 2022/0042785 A1 Feb. 10, 2022

(30) Foreign Application Priority Data
Nov. 5, 2018 (EP) .................................... 18204274

(51) Int. Cl.
*G01B 11/00* (2006.01)
*G01N 21/25* (2006.01)

(52) U.S. Cl.
CPC ........... *G01B 11/002* (2013.01); *G01N 21/25* (2013.01); *G01N 2201/08* (2013.01)

(58) Field of Classification Search
CPC ... G01B 11/002; G01N 21/25; G01N 2201/08
See application file for complete search history.

(56) References Cited

U.S. PATENT DOCUMENTS

| 5,790,242 | A | * | 8/1998 | Stern | ........................ | G01S 17/46 |
| | | | | | | 356/4.06 |
| 9,739,600 | B1 | | 8/2017 | Fresquet et al. | | |
| 2008/0030743 | A1 | | 2/2008 | Lehmann | | |

FOREIGN PATENT DOCUMENTS

| EP | 0762143 A1 | 3/1997 |
| JP | S63153419 A | 6/1988 |

(Continued)

OTHER PUBLICATIONS

International Preliminary Report on Patentability for corresponding PCT/EP2019/080107 dated May 20, 2021, 11 Pages.

(Continued)

*Primary Examiner* — Jamil Ahmed
(74) *Attorney, Agent, or Firm* — Armstrong Teasdale LLP

(57) ABSTRACT

Described herein is a detector (110) for determining a position of at least one object (112). The detector (110) includes:
at least one transfer device (114) with chromatic aberration;
at least one aperture element (118), wherein the aperture element (118) is configured to block edge components of a light beam (120) propagating from the object (112) to the detector (110) and having passed the transfer device (114);
at least one first optical sensor (126) positioned in a direction of propagation of the light beam (120) behind the aperture element (118); and
at least one second optical sensor (128), wherein the second optical sensor (128) is configured to determine (Continued)

at least one second intensity information of the edge components of the light beam (120).

14 Claims, 2 Drawing Sheets

(56) References Cited

FOREIGN PATENT DOCUMENTS

| | | |
|---|---|---|
| JP | H0444285 A | 2/1992 |
| JP | 2018151282 A | 9/2018 |
| WO | 2009153067 A2 | 12/2009 |
| WO | 2014097181 A1 | 6/2014 |
| WO | 2018091638 A1 | 5/2018 |
| WO | 2018091640 A2 | 5/2018 |
| WO | 2018091649 A1 | 5/2018 |
| WO | WO-2018091649 A1 * 5/2018 ............ G01J 1/0411 |
| WO | 2018167215 A1 | 9/2018 |

OTHER PUBLICATIONS

International Search Report and Written Opinion for corresponding PCT/EP2019/080107 dated Feb. 5, 2020, 13 Pages.

* cited by examiner

DETECTOR AND METHOD FOR DETERMINING A POSITION OF AT LEAST ONE OBJECT

CROSS-REFERENCE TO RELATED APPLICATIONS

This application is a U.S. National Phase Application of International Patent Application No. PCT/EP2019/080107, filed Nov. 4, 2019, which claims the benefit of priority to European Patent Application No. 18204274.7, filed Nov. 5, 2018, the entire contents of which are hereby incorporated by reference herein.

FIELD OF THE INVENTION

The invention relates to a detector and a method for determining a position of at least one object. The detector and the method according to the present invention specifically may be employed for example for distance determination using confocal chromatic sensors e.g. in the field of architecture, metrology, archaeology, arts, medicine, engineering or manufacturing. However, other applications are also possible.

BACKGROUND OF THE INVENTION

A large number of optical sensors are known for determining a distance between an object and the optical sensor such as Time-of-Flight detectors, triangulation systems and sensors which use a depth-from-defocus technique. A further concept for determining a distance from the object is called Distance by Photon Ratio (DPR) and is proposed for example WO 2018/091640 A2 the full content of which is included by reference. WO 2018/091640 A2 describes a detector for determining a position of at least one object The detector comprises: at least one transfer device, wherein the transfer device has at least one focal length in response to at least one incident light beam propagating from the object to the detector; at least two optical sensors, wherein each optical sensor has at least one light sensitive area, wherein each optical sensor is designed to generate at least one sensor signal in response to an illumination of its respective light-sensitive area by the light beam, at least one evaluation device being configured for determining at least one longitudinal coordinate z of the object by evaluating a quotient signal Q from the sensor signals. The detector is adapted to determine the longitudinal coordinate z of the object in at least one measurement range independent from the object size in an object plane. These devices and methods based on DPR technology allow reliable and accurate distance determination.

For distance measurements with very high accuracies such as in the order of 10 nm conventionally confocal chromatic sensors are used. For example, from Micro-Epsilon Messtechnik GmbH & Co. KG, Königbacherstr. 15, 94496 Ortenburg confocal chromatic sensors are available under model number IFS2403-0,4 or IFS 2405-30, which can measure distances through optical fibers with accuracies in the order of 10 nm to several hundred micrometers. The measurement range of these systems is typically in the order of 400 μm to 30 mm. However, a minimum measurement distance, also denoted as standoff distance, of known confocal chromatic sensors can be very large. For example, for the sensor with the model number IFS 2405-30, the measurement range is 30 mm, the accuracy is 180 nm and the standoff distance is 100 mm according to the manufacturer specification. The confocal chromatic sensor is not able to deliver measurement values if the object is outside the measurement range. Measurements with confocal chromatic sensors are, thus, limited to the measurement range. Moreover, it can be a challenge to find the measurement range of the sensor, especially in fully automated processes.

EP 0 762 143 A1 describes a three dimensional sensor which includes an illumination source that produces broadband, high intensity optical energy including a number of individual wavelength components. The components are impinged in a spot on a target. Dispersion is applied to the light reflected from the spot, either before target impingement, after target impingement, or both, whereby light of different wavelengths is focused at different ranges. The wavelength of maximum reflection is detected to determine the target range.

U.S. Pat. No. 9,739,600 B1 describes a confocal chromatic device for inspecting the surface of an object such as a wafer, including a plurality of optical measurement channels with collection apertures arranged for collecting the light reflected by the object through a chromatic lens at a plurality of measurement points, the plurality of optical measurement channels including optical measurement channels with an intensity detector for measuring a total intensity of the collected light.

US 2008/030743 describes a measuring device for measuring the shape, contour and/or roughness of a workpiece which is based on a contact-less optical probe having a large numeric aperture. The probe has at least two different focal points with which at least two photo receptors are associated. The latter generate a differential signal for controlling a positioning device for tracking the optical probe in such a manner that the workpiece surface is maintained within the measuring range of the probe.

WO 2018/167215 A1 describes a detector for determining a position of at least one object. The detector comprises:—at least one angle dependent optical element adapted to generate at least one light beam having at least one beam profile depending on an angle of incidence of an incident light beam propagating from the object towards the detector and illuminating the angle dependent optical element, wherein the angle dependent optical element comprises at least one optical element selected from the group consisting of: at least one optical fiber, in particular at least one multifurcated optical fiber; at least one diffractive optical element; at least one angle dependent reflective element, at least one diffractive grating element, in particular a blaze grating element; at least one aperture stop; at least one prism; at least one lens; at least one lens array, in particular at least one microlens array; at least one optical filter; at least one polarization filter; at least one bandpass filter; at least one liquid crystal filter, in particular a liquid crystal tunable filter; at least one short-pass filter; at least one long-pass filter; at least one notch filter; at least one interference filter; at least one transmission grating; at least one nonlinear optical element; —at least two optical sensors, wherein each optical sensor has at least one light sensitive area, wherein each optical sensor is designed to generate at least one sensor signal in response to an illumination of its respective light-sensitive area by the light beam generated by the angle dependent optical element; at least one evaluation device being configured for determining at least one longitudinal coordinate z of the object by evaluating a combined signal Q from the sensor signals.

Problem Addressed by the Invention

It is therefore an object of the present invention to provide devices and methods facing the above-mentioned technical challenges of known devices and methods. Specifically, it is an object of the present invention to provide devices and methods which allow distance determination with high reliability and accuracy over a broader measurement range, preferably with a low technical effort and with low requirements in terms of technical resources and cost.

SUMMARY OF THE INVENTION

This problem is solved by the invention with the features of the independent patent claims. Advantageous developments of the invention, which can be realized individually or in combination, are presented in the dependent claims and/or in the following specification and detailed embodiments.

As used in the following, the terms "have", "comprise" or "include" or any arbitrary grammatical variations thereof are used in a non-exclusive way. Thus, these terms may both refer to a situation in which, besides the feature introduced by these terms, no further features are present in the entity described in this context and to a situation in which one or more further features are present. As an example, the expressions "A has B", "A comprises B" and "A includes B" may both refer to a situation in which, besides B, no other element is present in A (i.e. a situation in which A solely and exclusively consists of B) and to a situation in which, besides B, one or more further elements are present in entity A, such as element C, elements C and D or even further elements.

Further, it shall be noted that the terms "at least one", "one or more" or similar expressions indicating that a feature or element may be present once or more than once typically will be used only once when introducing the respective feature or element. In the following, in most cases, when referring to the respective feature or element, the expressions "at least one" or "one or more" will not be repeated, non-withstanding the fact that the respective feature or element may be present once or more than once.

Further, as used in the following, the terms "preferably", "more preferably", "particularly", "more particularly", "specifically", "more specifically" or similar terms are used in conjunction with optional features, without restricting alternative possibilities. Thus, features introduced by these terms are optional features and are not intended to restrict the scope of the claims in any way. The invention may, as the skilled person will recognize, be performed by using alternative features. Similarly, features introduced by "in an embodiment of the invention" or similar expressions are intended to be optional features, without any restriction regarding alternative embodiments of the invention, without any restrictions regarding the scope of the invention and without any restriction regarding the possibility of combining the features introduced in such a way with other optional or non-optional features of the invention.

In a first aspect of the present invention a detector for determining a position of at least one object is disclosed.

As used herein, the term "object" refers to at least one arbitrary measurement object and/or to at least arbitrary object to be measured. The object may be a point like object or an extended object or region. The object may emit at least one light beam such as a light beam from an illumination source directly or indirectly illuminating the object, wherein the light beam is reflected or scattered by the object. As used herein, the term "position" refers to at least one item of information regarding a location and/or orientation of the object and/or at least one part of the object in space. Thus, the at least one item of information may imply at least one distance between at least one point of the object and the at least one detector. As will be outlined in further detail below, the distance may be a longitudinal coordinate or may contribute to determining a longitudinal coordinate of the point of the object. Additionally or alternatively, one or more other items of information regarding the location and/or orientation of the object and/or at least one part of the object may be determined. As an example, additionally, at least one transversal coordinate of the object and/or at least one part of the object may be determined. Thus, the position of the object may imply at least one longitudinal coordinate of the object and/or at least one part of the object. Additionally or alternatively, the position of the object may imply at least one transversal coordinate of the object and/or at least one part of the object. Additionally or alternatively, the position of the object may imply at least one orientation information of the object, indicating an orientation of the object in space.

The detector comprises:
- at least one transfer device with chromatic aberration;
- at least one aperture element, wherein the aperture element is configured to block edge components of a light beam propagating from the object to the detector and having passed the transfer device, wherein the aperture element is configured to let pass central components of said light beam;
- at least one first optical sensor positioned in a direction of propagation of said light beam behind the aperture element, wherein the first optical sensor is configured for determining a color information of the central components of said light beam and wherein the first optical sensor is configured for determining at least one first intensity information of the central components of said light beam;
- at least one second optical sensor, wherein the second optical sensor is configured to determine at least one second intensity information of the edge components of said light beam.

As used herein, the term "transfer device", also denoted as "transfer system", may generally refer to one or more optical elements which are adapted to modify the incident light beam, such as by modifying one or more of a beam parameter of the light beam, a width of the light beam or a direction of the light beam. The transfer device may be adapted to guide the light beam onto the optical sensors. The transfer device may comprise at least one lens or lens system with chromatic aberration. As used herein "chromatic aberration" refers to the transfer device having different refractive indices for different wavelengths of light. Specifically, the transfer device may be configured to focus light impinging on the transfer device at different and wavelength dependent focal points. The transfer device may have different focal lengths for different wavelengths. As used herein, the term "focal length" of the transfer device refers to a distance over which incident collimated rays which may impinge the transfer device are brought into a "focus" which may also be denoted as "focal point". Thus, the focal length constitutes a measure of an ability of the transfer device to converge an impinging light beam. For a transfer device with chromatic aberration the focal length may dependent on the refractive index which is wavelength dependent such that light having different wavelengths will be focused on different and wavelength dependent positions. The focal length for a wavelength may be defined as a distance from the center of the lens or lens system to the principal focal point for this wavelength.

The transfer device may have an optical axis. In particular, the detector and the transfer device have a common optical axis. As used herein, the term "optical axis of the transfer device" generally refers to an axis of mirror symmetry or rotational symmetry of the lens or lens system. The optical axis of the detector may be a line of symmetry of the optical setup of the detector. The transfer device such as a lens system, as an example, may comprise at least one beam path, with the elements of the transfer device in the beam path being located in a rotationally symmetrical fashion with respect to the optical axis. Still, one or more optical elements located within the beam path may also be off-centered or tilted with respect to the optical axis. In this case, however, the optical axis may be defined sequentially, such as by interconnecting the centers of the optical elements in the beam path, e.g. by interconnecting the centers of the lenses, wherein, in this context, the optical sensors are not counted as optical elements. The optical axis generally may denote the beam path. Therein, the detector may have a single beam path along which a light beam may travel from the object to the optical sensors, or may have a plurality of beam paths. As an example, a single beam path may be given or the beam path may be split into two or more partial beam paths. In the latter case, each partial beam path may have its own optical axis and the condition noted above generally may refer to each beam path independently. The optical sensors may be located in one and the same beam path or partial beam path. Alternatively, however, the optical sensors may also be located in different partial beam paths.

The transfer device may constitute a coordinate system, wherein a longitudinal coordinate l is a coordinate along the optical axis and wherein d is a spatial offset from the optical axis. The coordinate system may be a polar coordinate system in which the optical axis of the transfer device forms a z-axis and in which a distance from the z-axis and a polar angle may be used as additional coordinates. A direction parallel or antiparallel to the z-axis may be considered a longitudinal direction, and a coordinate along the z-axis may be considered a longitudinal coordinate l. Any direction perpendicular to the z-axis may be considered a transversal direction, and the polar coordinate and/or the polar angle may be considered a transversal coordinate.

The detector furthermore may comprise one or more of: at least one lens, for example at least one lens selected from the group consisting of at least one refractive lens, at least one focus-tunable lens, at least one aspheric lens, at least one spheric lens, at least one Fresnel lens, at least one aspheric lens; at least one diffractive optical element; at least one concave mirror; at least one beam deflection element, preferably at least one mirror; at least one semipermeable mirror; at least one beam splitting element, preferably at least one of a beam splitting cube or a beam splitting mirror; at least one multi-lens system. Additionally, the detector may comprise at least one wavelength-selective element, for example at least one optical filter. Additionally, the detector may comprise at least one element which is designed to impress a predefined beam profile on the electromagnetic radiation, for example, at the location of a sensor region of the optical sensors. These optional embodiments of the detector can, in principle, be realized individually or in any desired combination.

As used herein, the term "aperture element" refers to at least one element configured to limit ray bundles. The aperture element may comprise at least one aperture stop. The aperture element may have at least one opening such as at least one hole. The aperture element is configured to block edge components of a light beam propagating from the object to the detector and having passed the transfer device and to let pass central components of said light beam. As used herein, the term "to block" refers to one or more of at least partially stopping, limiting, reducing and attenuating at least parts and/or intensity of at least parts of the light beam impinging on the aperture element. As used herein, the term "to let pass" refers to essentially unimpeded pass through the aperture element, wherein losses in intensity below or equal 10% of total intensity of the component of the light beam, preferably below or equal 5% of total intensity of the component of the light beam, more specifically below or equal 2% of total intensity of the component of the light beam are possible. When a polychromatic illumination light beam such as a white light beam is focused by the transfer device on the object, the different wavelengths may be focused in different distances from the transfer device. The object may reflect a focused beam component in the wavelength corresponding to an object distance and unfocussed beam components with the remaining wavelengths. The reflected light may impinge on the transfer device and subsequently on the aperture element. The aperture element may be arranged such that the reflected unfocused beam components may impinge unfocused on the aperture element. The aperture element may be configured to block the reflected unfocused beam components. The aperture element may be arranged such that the reflected focused beam components may impinge essentially focused on the aperture element. The aperture element may be configured to let the reflected focused beam components pass. Specifically, the aperture element may be configured to let pass light having a certain degree of collimation and to block light below said degree of collimation. For example, the aperture element may be configured to let only essentially focused light pass and to block unfocussed components. As used herein, the term "focused" generally refers to one or both of a minimum extend of a circle of confusion of the light beam. As used herein, the term "circle of confusion" refers to a light spot caused by a cone of light rays of the light beam focused by the transfer device. As outlined above, the transfer device may have a wavelength dependent focal length. The circle of confusion may depend on the focal length of the transfer device and, thus, on the wavelength. Furthermore, the circle of confusion may depend on a longitudinal distance from the object to the transfer device, a diameter of an exit pupil of the transfer device and a longitudinal distance from the transfer device. As used herein, the term "essentially focused" refers to minimum extend of the circle of confusion, wherein deviations below or equal 10% from the minimum extend of the circle of confusion, preferably below or equal 5% from the minimum extend of the circle of confusion, more specifically below or equal 2% from the minimum extend of the circle of confusion are possible.

As used herein, the term "central components" refers to components of the light beam propagating from the object to the detector which impinge at the opening of the aperture element on the aperture element such as reflected focused beam components. As used herein, the term "edge components" refers to components of the light beam propagating from the object to the detector which impinge outside the opening of the aperture element on the aperture element such as reflected unfocused beam components. The terms "edge components" and "central components" moreover refer to different areas of a beam profile of the light beam propagating from the object to the detector such as a first area and a second area. The first area of the beam profile may comprise essentially edge information of the beam profile and the second area of the beam profile may comprise essentially center information of the beam profile. The beam profile may have a center, i.e. a maximum value of the beam profile and/or a center point of a plateau of the beam profile and/or a geometrical center of the light spot, and falling edges extending from the center. The second region may comprise inner regions of the cross section and the first region may comprise outer regions of the cross section. As used herein, the term "essentially center information" generally refers to a low proportion of edge information, i.e. proportion of the intensity distribution corresponding to edges, compared to a proportion of the center information, i.e. proportion of the intensity distribution corresponding to the center. Preferably the center information has a proportion of edge information of less than 10%, more preferably of less than 5%, most preferably the center information comprises no edge content. As used herein, the term "essentially edge information" generally refers to a low proportion of center information compared to a proportion of the edge information. The edge information may comprise information of the whole beam profile, in particular from center and edge regions. The edge information may have a proportion of center information of less than 10%, preferably of less than 5%, more preferably the edge information comprises no center content.

The detector may comprise at least one illumination source. As used herein, the term "illumination source" refers to at least one device configured for generating at least one light beam. The illumination source may be or may comprise at least one light source. The light source may be or may comprise at least one multiple beam light source. The illumination source may be adapted to illuminate the object with at least one illumination light beam. The illumination source may be configured to illuminate the object with a polychromatic light beam. The illumination source may comprise at least one polychromatic white light source. For example, the light source may comprise at least one laser source, specifically at least one broadband laser source.

As used herein, the term "ray" generally refers to a line that is perpendicular to wavefronts of light which points in a direction of energy flow. As used herein, the term "beam" generally refers to a collection of rays. In the following, the terms "ray" and "beam" will be used as synonyms. As further used herein, the term "light beam" generally refers to an amount of light, specifically an amount of light traveling essentially in the same direction, including the possibility of the light beam having a spreading angle or widening angle. The light beam may have a spatial extension. Specifically, the light beam may have a non-Gaussian beam profile. The beam profile may be selected from the group consisting of a trapezoid beam profile; a triangle beam profile; a conical beam profile. The trapezoid beam profile may have a plateau region and at least one edge region. As used herein, the term "beam profile" generally refers to a transverse intensity profile of the light beam. The beam profile may be a spatial distribution, in particular in at least one plane perpendicular to the propagation of the light beam, of an intensity of the light beam. The light beam specifically may be a Gaussian light beam or a linear combination of Gaussian light beams, as will be outlined in further detail below. Other embodiments are feasible, however. The transfer device configured for one or more of adjusting, defining and determining the beam profile, in particular a shape of the beam profile.

As used herein, the term "light" generally refers to electromagnetic radiation in one or more of the visible spectral range, the ultraviolet spectral range and the infrared spectral range. Therein, the term visible spectral range generally refers to a spectral range of 380 nm to 780 nm. The term infrared spectral range generally refers to electromagnetic radiation in the range of 780 nm to 1 mm, preferably in the range of 780 nm to 3.0 micrometers. The term ultraviolet spectral range generally refers to electromagnetic radiation in the range of 1 nm to 380 nm, preferably in the range of 100 nm to 380 nm. Preferably, light as used within the present invention is visible light, i.e. light in the visible spectral range, or infrared light. The term "light beam" generally may refer to an amount of light emitted and/or reflected into a specific direction. Thus, the light beam may be a bundle of the light rays having a predetermined extension in a direction perpendicular to a direction of propagation of the light beam. Preferably, the light beams may be or may comprise one or more Gaussian light beams such as a linear combination of Gaussian light beams, which may be characterized by one or more Gaussian beam parameters, such as one or more of a beam waist, a Rayleigh-length or any other beam parameter or combination of beam parameters suited to characterize a development of a beam diameter and/or a beam propagation in space. As outlined above, the light beam may comprise a plurality of wavelengths such as at least two, three or more wavelengths.

As used herein, the term "optical sensor" generally refers to a light-sensitive device for detecting a light beam, such as for detecting an illumination and/or a light spot generated by at least one light beam. The terms "first" and "second" optical sensor are used as names and give no indication of an order or if the detector comprises further optical sensors. Each of the first optical sensor and the second optical sensor may have a light-sensitive area. As used herein, a "light-sensitive area" generally refers to an area of the respective optical sensor which may be illuminated externally, by the at least one light beam, in response to which illumination at least one sensor signal is generated. The light-sensitive area may specifically be located on a surface of the respective optical sensor. Other embodiments, however, are feasible.

One or both of the first optical sensor and the second optical sensor may comprise a sensor element having a matrix of pixels. As used herein, the term "sensor element" generally refers to a device or a combination of a plurality of devices configured for sensing at least one parameter. In the present case, the parameter specifically may be an optical parameter, and the sensor element specifically may be an optical sensor element. The sensor element may be formed as a unitary, single device or as a combination of several devices. As further used herein, the term "matrix" generally refers to an arrangement of a plurality of elements in a predetermined geometrical order. The matrix, specifically, may be or may comprise a rectangular matrix having one or more rows and one or more columns. The rows and columns specifically may be arranged in a rectangular fashion. It shall be outlined, however, that other arrangements are feasible, such as nonrectangular arrangements. As an example, circular arrangements are also feasible, wherein the elements are arranged in concentric circles or ellipses about a center point. For example, the matrix may be a single row of pixels. Other arrangements are feasible. The light-sensitive areas of the pixels of the matrix specifically may be equal in one or more of size, sensitivity and other optical, electrical and mechanical properties. The light-sensitive areas of all pixels of the matrix specifically may be located in a common plane, the common plane preferably facing the object, such that a light beam propagating from the object to the detector may generate a light spot on the common plane.

Each of the first optical sensor and the second optical sensor may be configured to generate at least one sensor signal, such as at least one output signal, in response to illumination of its light-sensitive area. One or both of the first optical sensor and the second optical sensor, for example, may comprise one or more of at least one bi-cell diode, at least one quadrant diode; at least one CCD chip, at least one CMOS chip. As used herein, a "sensor signal" generally refers to a signal generated by an optical sensor in response to the illumination by the light beam. Specifically, the sensor signal may be or may comprise at least one electrical signal, such as at least one analogue electrical signal and/or at least one digital electrical signal. More specifically, the sensor signal may be or may comprise at least one voltage signal and/or at least one current signal. More specifically, the sensor signal may comprise at least one photocurrent. Further, either raw sensor signals may be used, or the detector, the optical sensor or any other element may be adapted to process or preprocess the sensor signal, thereby generating secondary sensor signals, which may also be used as sensor signals, such as preprocessing by filtering or the like.

The first optical sensor is positioned in a direction of propagation of the light beam propagating from the object to the detector behind the aperture element. Thus, for example, the light beam, specifically central components of the light beam, propagating from the object to the detector may firstly impinge on the transfer device, subsequently on the aperture element and then on the first optical sensor.

The first optical sensor is configured for determining color information of the central components of the light beam propagating from the object to the detector. The detector may comprise at least one confocal chromatic sensor. Specifically, the detector comprises at least one first measurement channel comprising the confocal chromatic sensor. The confocal chromatic sensor may comprise the first optical sensor. The first optical sensor may be or may comprise at least one spectrometer device and/or at least one color analyzer. For example, the first optical sensor may comprise at least one wavelength dependent prism and/or at least one spectral filter. As used herein, the term "color information" refers to wavelength dependent information such as at least one intensity distribution and/or information about a wavelength having maximum intensity and/or at least one longitudinal coordinate of the object. The term "wavelength dependent information" refers to intensity distribution as a function of wavelength, specifically to a spectrum. The first optical sensor may comprise at least one sensor element for determining the color information of the central components. The detector may comprise at least one evaluation device which is configured for determining at least one longitudinal coordinate of the object z by evaluating the color information. The object distance may be given by a correspondence between the longitudinal coordinate z and the wavelength. Each wavelength of the intensity distribution may correspond to one longitudinal coordinate z of the object. Relationship between the wavelength and the longitudinal coordinate z may be predetermined such as during a calibration process. The intensity distribution may comprise a maximum which corresponds to the wavelength having the focal point at the position of the aperture element, in particular which corresponds to the wavelength of the reflected focused beam components. Other wavelengths may generate attenuated signals on the first optical sensor. The evaluation device may be configured to determine the maximum of the intensity distribution. The evaluation device may be configured to determine the wavelength at the maximum of the intensity distribution and to determine therefrom the longitudinal coordinate of the object.

The confocal chromatic sensor may be a fiber optical confocal chromatic sensor comprising at least one first optical fiber. The first optical fiber may be adapted to transmit at least parts of the incident light beam which are not absorbed and/or reflected, between two ends of the first optical fiber. The first optical fiber may have a length and may be adapted to permit transmission over a distance. The first optical fiber may comprise at least one material selected from the group consisting of: silica, aluminosilicate glass, germane silicate glass, fluorozirconate, rare earth doped glass, fluoride glass, chalcogenide glasses, sapphire, doped variants, especially for silica glass, phosphate glass, PMMA, polystyrene, fluoropolymers such as poly(perfluoro-butenyl-vinyl ether), or the like. The first optical fiber may be a single or multi-mode fiber. The first optical fiber may be a step index fiber, a polarizing fiber, a polarization maintaining fiber, a plastic optical fiber, a glass optical fiber, or the like. The first optical fiber may comprise at least one fiber core which is surrounded by at least one fiber cladding having a lower index of refraction as the fiber core. The fiber cladding may also be a double or multiple cladding. The fiber cladding may comprise a so-called outer jacket. The fiber cladding may be coated by a so-called buffer adapted to protect the optical fiber from damages and moisture. The buffer may comprise at least one UV-cured urethane acrylate composite and/or at least one polyimide material. In one embodiment, a refractive index of the fiber core may be higher than the refractive index of the fiber cladding material and the optical fiber may be adapted to guide the incoming light beam by total internal reflection below the angle of acceptance. In one embodiment, the first optical fiber may comprise at least one hollow core fiber, also called photonic bandgap fiber. The hollow-core fiber may be adapted to guide the incoming light beam essentially within a so-called hollow region, wherein a minor portion of the light beam is lost due to propagation into the fiber cladding material.

The first optical fiber may comprise at least one first fiber end. The first fiber end may be configured for emitting the at least one light beam for illuminating the object and/or to receive at least partially the central components of the light beam propagating from the object to the detector. The illumination source may be configured to couple at least one light beam into the first optical fiber. In this embodiment, the aperture of the optical fiber may be designed as the aperture element which is configured to block the edge components, in particular unfocussed light, and to let pass the central components. Thus, the illumination light beam and the light beam reflected by the object may be coupled and transmitted through the same fiber. The first optical fiber may have at least one second fiber end. The second fiber end may be configured to provide light having passed through the first optical fiber to the first optical sensor.

The first optical sensor is configured for determining the at least one first intensity information of the central components of the light beam propagating from the object to the detector. As used herein, the term "first intensity information of the central components" refers to one or more of: information about the beam profile of the central components, an intensity value, and an intensity distribution of the central components. As outlined above, the first optical sensor is positioned in a direction of propagation of the light beam propagating from the object to the detector behind the aperture element. Thus, the edge components of the light beam propagating from the object to the detector may be blocked by the aperture element and only the central components pass through the aperture element to the first optical sensor. For example, the first optical sensor may be positioned behind an aperture stop. For example, in case of a fiber optical confocal chromatic sensor, the first optical sensor may be positioned at the second end of the first optical fiber, as described above or in more detail below. As outlined above, the first optical sensor may comprise the at least one light-sensitive area which in response to illumination generates the at least one sensor signal. The sensor signal may depend on the intensity of a light spot generated by the light beam impinging on the light-sensitive area. The light spot generated on the light-sensitive area may have a round or non-round shape. As used herein, a "light spot" generally refers to a visible or detectable round or non-round illumination of an article, an area or object by a light beam.

The second optical sensor is configured to determine at least one second intensity information of the edge components of the light beam propagating from the object to the detector. As used herein, the term "second intensity information of the edge components" refers to one or more of: information about the beam profile of the edge components, an intensity value, and an intensity distribution of the edge components. The second optical sensor may be positioned in a direction of propagation of the light beam propagating from the object to the detector in front of the aperture element. Thus, the second optical sensor may be position such that the edge components of the light beam propagating from the object to the detector can at least partially reach the second optical sensor. As used herein, the term "at least partially reach" refers to sufficient amount of the edge components to generate a measurable intensity signal on the second optical sensor. For example, the second optical sensor may be positioned in a direction of propagation of the light beam propagating from the object to the detector in front the aperture element and/or on the aperture element and/or monolithic with the aperture element. For example, the detector may comprise at least one second optical fiber. The second optical fiber may be arranged to receive at least partially the edge components. For example, the second optical fiber may comprise a receiving end. The receiving end may be positioned in a direction of propagation of the light beam propagating from the object to the detector in front of the aperture element. The second optical fiber may be configured to provide light having passed through the second optical fiber to the second optical sensor. The second optical sensor may be positioned at a further end of the second optical fiber. As outlined above, the second optical sensor may comprise the at least one light-sensitive area which in response to illumination generates the at least one sensor signal. The sensor signal may depend on the intensity of a light spot generated by the light beam impinging on the light-sensitive area.

The first optical sensor and the second optical sensor may have light-sensitive areas having an identical size or may have light-sensitive areas having different size.

One or both of the first and the second optical sensors may be sensitive in one or more of the ultraviolet, the visible or the infrared spectral range. Specifically, one or both of the first and the second optical sensors may be sensitive in the visible spectral range from 400 nm to 780 nm, most preferably at 650 nm to 750 nm. Specifically, one or both of the first and the second optical sensors may be sensitive in the near infrared region. Specifically, one or both of the first and the second optical sensors may be sensitive in the part of the near infrared region where silicon photodiodes are applicable specifically in the range of 700 nm to 1000 nm. One or both of the first and the second optical sensors, specifically, may be sensitive in the infrared spectral range, specifically in the range of 780 nm to 3.0 micrometers. For example, one or both of the first and the second optical sensors, independently, may be or may comprise at least one element selected from the group consisting of a photodiode, a photocell, a photoconductor, a phototransistor or any combination thereof. For example, one or both of the first and the second optical sensors may be or may comprise at least one element selected from the group consisting of a CCD sensor element, a CMOS sensor element, a photodiode, a photocell, a photoconductor, a phototransistor or any combination thereof. Any other type of photosensitive element may be used. The photosensitive element generally may fully or partially be made of inorganic materials and/or may fully or partially be made of organic materials. Most commonly, as will be outlined in further detail below, one or more photodiodes may be used, such as commercially available photodiodes, e.g. inorganic semiconductor photodiodes. As further used herein, the term "photosensitive element" generally refers to an element which is sensitive against illumination in one or more of the ultraviolet, the visible or the infrared spectral range. Specifically, the photosensitive element may be or may comprise at least one element selected from the group consisting of a photodiode, a photocell, a photoconductor, a phototransistor or any combination thereof. Any other type of photosensitive element may be used.

One or both of the first and the second optical sensors specifically may be semiconductor sensors, preferably inorganic semiconductor sensors, more preferably photodiodes and most preferably silicon photodiodes. Specifically, one or both of the first and the second optical sensors may be or may comprise inorganic photodiodes which are sensitive in the infrared spectral range, preferably in the range of 780 nm to 3.0 micrometers, and/or sensitive in the visible spectral range, preferably in the range of 380 nm to 780 nm. Specifically, one or both of the first and the second optical sensors may be sensitive in the part of the near infrared region where silicon photodiodes are applicable specifically in the range of 700 nm to 1000 nm. Infrared optical sensors which may be used for the optical may be commercially available infrared optical sensors, such as infrared optical sensors commercially available under the brand name Hertzstueck™ from trinamiX GmbH, D-67056 Ludwigshafen am Rhein, Germany. Thus, as an example, one or both of the first and the second optical sensors may comprise at least one optical sensor of an intrinsic photovoltaic type, more preferably at least one semiconductor photodiode selected from the group consisting of: a Ge photodiode, an InGaAs photodiode, an extended InGaAs photodiode, an InAs photodiode, an InSb photodiode, a HgCdTe photodiode. Additionally or alternatively, one or both of the optical sensors may comprise at least one optical sensor of an extrinsic photovoltaic type, more preferably at least one semiconductor photodiode selected from the group consisting of: a Ge:Au photodiode, a Ge:Hg photodiode, a Ge:Cu photodiode, a Ge:Zn photodiode, a Si:Ga photodiode, a Si:As photodiode. Additionally or alternatively, one or both of the first and the second optical sensors may comprise at least one at least one photoconductive sensor such as a PbS or PbSe sensor, a bolometer, preferably a bolometer selected from the group consisting of a VO bolometer and an amorphous Si bolometer. One or both of the optical sensors may be opaque, transparent or semitransparent. For the sake of simplicity, however, opaque sensors which are not transparent for the light beam, may be used, since these opaque sensors generally are widely commercially available.

The detector may comprise the at least one evaluation device being configured for determining at least one longitudinal coordinate $z_{DPR}$ of the object by evaluating a combined signal Q from the first intensity information of the central components and the second intensity information of the edge components. As used herein, the term "evaluation device" generally refers to an arbitrary device adapted to perform the named operations, preferably by using at least one data processing device and, more preferably, by using at least one processor and/or at least one application-specific integrated circuit. Thus, as an example, the at least one evaluation device may comprise at least one data processing device having a software code stored thereon comprising a number of computer commands. The evaluation device may provide one or more hardware elements for performing one or more of the named operations and/or may provide one or more processors with software running thereon for performing one or more of the named operations.

The evaluation device may be configured for generating the output based on the distance by photon ratio (DPR) technique which is described e.g. in WO 2018/091649 A1, WO 2018/091638 A1 and WO 2018/091640, the content of which is included by reference. The DPR technique allows distance measurements such as determining a longitudinal coordinate of the object. In addition, the DPR technique also allows recognizing geometrical changes to the light beam upon traversing the area of surveillance such as partial coverage of the light beam.

As used herein, the term "combined signal Q" refers to a signal which is derived by one or more of: forming a quotient of the first intensity information of the central components and the second intensity information of the edge components; forming a quotient of a multiples of the first intensity information of the central components and the second intensity information of the edge components; forming a quotient of linear combinations of the first intensity information of the central components and the second intensity information of the edge components; forming a quotient of a linear combination of the first intensity information of the central components and the second intensity information of the edge components. The combined signal Q may be determined by using various means. As an example, a software means for deriving the combined signal, a hardware means for deriving the combined signal, or both, may be used and may be implemented in the evaluation device. Thus, the evaluation device, as an example, may comprise at least one divider, wherein the divider is configured for deriving the quotient signal. The divider may fully or partially be embodied as one or both of a software divider or a hardware divider.

For example, the evaluation device may be configured for deriving the combined signal Q by $$Q(z_O) = \frac{\int\int_{A_1} E(x, y; z_O) dx dy}{\int\int_{A_2} E(x, y; z_O) dx dy}$$

wherein x and y are transversal coordinates, A1 and A2 are areas of the beam profile of the light beam at the position of the first optical sensor and the second optical sensor, respectively, and $E(x,y,z_o)$ denotes the beam profile for the distance of the object $z_o$. Area A1 and area A2 may differ. In particular, A1 and A2 are not congruent. Thus, A1 and A2 may differ in one or more of the shape or content. The beam profile may be a cross section of the light beam. The beam profile may be selected from the group consisting of a trapezoid beam profile; a triangle beam profile; a conical beam profile and a linear combination of Gaussian beam profiles. Generally the beam profile is dependent on luminance $L(z_o)$ and beam shape $S(x,y; z_o)$, $E(x, y; zo)=L \cdot S$. Thus, by deriving the combined signal it may allow determining the longitudinal coordinate independent from luminance.

The sensor signals of the first optical sensor and the second optical sensors each may comprise information of at least one area of the beam profile of the light beam. As used herein, the term "area of the beam profile" generally refers to an arbitrary region of the beam profile at the respective sensor position used for determining the combined signal Q. The first area of the beam profile and second area of the beam profile may be one or both of adjacent or overlapping regions. The first area of the beam profile and the second area of the beam profile may be not congruent in area. The first area of the beam profile may comprise essentially edge information of the beam profile and the second area of the beam profile may comprise essentially center information of the beam profile. The first area of the beam profile may be area A2 and the second area of the beam profile may be area A1. The edge information may comprise information relating to a number of photons in the first area of the beam profile and the center information may comprise information relating to a number of photons in the second area of the beam profile. For example, the evaluation device may be adapted for determining the edge information by determining an area integral of the beam profile of the first area. The evaluation device may be adapted to determine the edge information by determining the edge information by integrating and/or summing of the first area. The evaluation device may be adapted to determine the center information by integrating and/or summing of the second area. The evaluation device may be configured to derive the combined signal Q by one or more of dividing the edge information and the center information, dividing multiples of the edge information and the center information, dividing linear combinations of the edge information and the center information. Thus, essentially, photon ratios may be used as the physical basis of the method.

As an example, Q may simply be determined as Q=s1/s2 or Q=s2/s1, with s1 denoting the sensor signal of the first optical sensor and s2 denoting the sensor signal of the second optical sensor. Additionally or alternatively, Q may be determined as Q=a·s1/b·s2 or Q=b·s2/a·s1, with a and b being real numbers which, as an example, may be predetermined or determinable. Additionally or alternatively, Q may be determined as Q=(a·s1+b·s2)/(c·s1+d·s2), with a, b, c and d being real numbers which, as an example, may be predetermined or determinable. As a simple example for the latter, Q may be determined as Q=s1/(s1+s2). Other combined signals are feasible.

The evaluation device may be configured for using at least one predetermined relationship between the combined signal Q and the longitudinal coordinate $z_{DPR}$ for determining the longitudinal coordinate $z_{DPR}$. The predetermined relationship may be one or more of an empiric relationship, a semi-empiric relationship and an analytically derived relationship. The evaluation device may comprise at least one data storage device for storing the predetermined relationship, such as a lookup list or a lookup table. The determining of the at least one longitudinal coordinate $z_{DPR}$ may be performed by the at least one evaluation device. Thus, as an example, the relationship may be implemented in software and/or hardware, such as by implementing one or more lookup tables. Thus, as an example, the evaluation device may comprise one or more programmable devices such as one or more computers, application-specific integrated circuits (ASICs), Digital Signal Processors (DSPs), or Field Programmable Gate Arrays (FPGAs) which are configured to perform the above-mentioned evaluation, in order to determine the at least one longitudinal coordinate $z_{DPR}$. Additionally or alternatively, however, the evaluation device may also fully or partially be embodied by hardware.

As outlined above, the evaluation device may be configured for determining at least one longitudinal coordinate of the object z by evaluating the color information of the central components. In addition, the evaluation device may be configured to determine the longitudinal coordinate $z_{DPR}$. The detector may be configured to determine the longitudinal coordinate $z_{DPR}$ and the longitudinal coordinate z simultaneously such as in two measurement channels.

The first optical sensor may have a measurement range. The measurement range may be defined by a range from a minimum measurement distance to a maximum measurement distance. The detector may comprise the at least one illumination source which is configured to generate at least one light beam for illuminating the object. The transfer device may be configured for focusing the light beam for illuminating the object at wavelength-dependent, consecutive focal points. The minimum measurement distance may be a distance from a light emitting area of the detector to a focal point of a wavelength Amin being closest to the light emitting area. The maximum measurement distance may be a distance from the light emitting area to a focal point of a wavelength Amax having the largest distance from the light emitting area. Usually confocal chromatic sensors are not able to deliver measurement values if the object is outside the measurement range. In conventional confocal chromatic sensors it can be a challenge to find the measurement range of the sensor, especially in fully automated processes. The detector according to the present invention may allow determining whether the object is within the measurement range. The evaluation device may be configured for determining if the object is located within or outside the measurement range by considering the determined longitudinal coordinate $z_{DPR}$. The evaluation device may be configured for determining whether the determined longitudinal coordinate $z_{DPR}$ lies within the measurement range. If the evaluation device has determined that the object is outside the measurement range, the evaluation device may be configured to issue at least one indication that the object is outside the measurement range and/or at least one indication to adapt the distance to the object and/or at least one indication of longitudinal coordinate $z_{DPR}$. If the evaluation device has determined that the object is within the measurement range, the evaluation device may be configured to issue at least one indication of the longitudinal coordinate z. Thus, the detector according to the present invention may combine distance measurement using the DPR technology and confocal chromatic sensing. Confocal chromatic sensing may use the central components and usually discards the unfocused parts. The DPR technique may use two or more integrals of beam profiles to determine the longitudinal coordinate $z_{DPR}$ such as of the central components, in particular the central area of the beam profile, and the edge components, in particular the outer area of the beam profile. The DPR measurement can be used to determine an indication of the distance to the object, such as a less accurate measurement compared to the confocal chromatic measurement, in order to determine the measurement range of the confocal chromatic sensor. Moreover, the DPR technique may allow extension of the measurement range of the confocal chromatic sensor since it may allow distance determination even outside the measurement range of the confocal chromatic sensor.

The detector may comprise at least one measuring head. The measuring head may comprise the at least one first fiber end of the first optical fiber and/or the receiving end of the second optical fiber. The first and the second optical fibers may serve as transport medium for the signals only. Thus, the first and the second optical fibers may be connected to the vacuum feedthrough and/or may be designed for high temperatures and/or rough chemical environments.

In addition, to the determination of the longitudinal coordinate of the object other coordinates of the object, including one or more transversal coordinates and/or rotational coordinates, may be determined by the evaluation device. Thus, as an example, one or more additional transversal sensors may be used for determining at least one transversal coordinate. Various transversal sensors are generally known in the art, such as the transversal sensors disclosed in WO 2014/097181 A1 and/or other position-sensitive devices (PSDs), such as quadrant diodes, CCD or CMOS chips or the like. These devices may generally also be implemented into the detector. As an example, a part of the light beam may be split off within the receiver unit, by at least one beam splitting element. The split-off portion, as an example, may be guided towards a transversal sensor, such as a CCD or CMOS chip or a camera sensor, and a transversal position of a light spot generated by the split-off portion on the transversal sensor may be determined, thereby determining at least one transversal coordinate.

In a further aspect, the present invention discloses a method for determining a position of at least one object. In the method a detector according to the present invention as disclosed above or as disclosed in further detail below is used. The method comprises the following method steps, wherein the method steps may be performed in the given order or may be performed in a different order. Further, one or more additional method steps may be present which are not listed. Further, one, more than one or even all of the method steps may be performed repeatedly.

The method comprises the following steps:

Illuminating at least one first optical sensor positioned in a direction of propagation of a light beam propagating from the object to the detector and having passed at least one transfer device with chromatic aberration behind at least one aperture element, wherein the aperture element is configured to block edge components of the light beam propagating from the object to the detector and having passed the transfer device, wherein the aperture element is configured to let pass central components of said light beam;

Determining a color information of the central components of said light beam with the first optical sensor and determining at least one first intensity information of the central components of said light beam by using the first optical sensor;

Determining at least one second intensity information of the edge components of said light beam by using at least one second optical sensor.

For details, options and definitions, reference may be made to the detector as discussed above.

The method may further comprise determining at least one longitudinal coordinate $z_{DPR}$ of the object by evaluating the combined signal Q from the first intensity information of the central components and the second intensity information of the edge components by using the at least one evaluation device. The method further may comprise determining at least one longitudinal coordinate of the object z by evaluating the color information of the central components by using the evaluation device. The determining of the longitudinal coordinate $z_{DPR}$ and the longitudinal coordinate z may be performed simultaneously. The first optical sensor may have a measurement range, wherein the evaluation device is configured for determining if the object is located within or outside the measurement range by considering the determined longitudinal coordinate $z_{DPR}$. If it is determined that the object is outside the measurement range, the method may comprise adapting the distance between the object and the detector.

In a further aspect of the present invention, use of the detector according to the present invention, such as according to one or more of the embodiments given above or given in further detail below, is proposed, for a purpose of use, selected from the group consisting of: metrology, factory automation, quality inspection, process automation, thickness measurements, confocal chromatic microscopy.

With respect to further uses of the device according to the present invention reference is made to in WO 2018/091649 A1, WO 2018/091638 A1 and WO 2018/091640, the content of which is included by reference.

Overall, in the context of the present invention, the following embodiments are regarded as preferred:

Embodiment 1: A detector for determining a position of at least one object, the detector comprising:
  at least one transfer device with chromatic aberration;
  at least one aperture element, wherein the aperture element is configured to block edge components of a light beam propagating from the object to the detector and having passed the transfer device, wherein the aperture element is configured to let pass central components of said light beam;
  at least one first optical sensor positioned in a direction of propagation of said light beam behind the aperture element, wherein the first optical sensor is configured for determining a color information of the central components of said light beam and wherein the first optical sensor is configured for determining at least one first intensity information of the central components of said light beam;
  at least one second optical sensor, wherein the second optical sensor is configured to determine at least one second intensity information of the edge components of said light beam.

Embodiment 2: The detector according to the preceding embodiment, wherein the detector comprises at least one evaluation device being configured for determining at least one longitudinal coordinate $z_{DPR}$ of the object by evaluating a combined signal Q from the first intensity information of the central components and the second intensity information of the edge components.

Embodiment 3: The detector according to the preceding embodiments, wherein the evaluation device is configured for using at least one predetermined relationship between the combined signal Q and the longitudinal coordinate $z_{DPR}$ of the object for determining the longitudinal coordinate $z_{DPR}$.

Embodiment 4: The detector according to any one of the two preceding embodiments, wherein the combined signal Q is derived by one or more of: forming a quotient of the first intensity information of the central components and the second intensity information of the edge components; forming a quotient of a multiples of the first intensity information of the central components and the second intensity information of the edge components; forming a quotient of linear combinations of the first intensity information of the central components and the second intensity information of the edge components; forming a quotient of a linear combination of the first intensity information of the central components and the second intensity information of the edge components.

Embodiment 5: The detector according to any one of the three preceding embodiments, wherein the evaluation device is configured for determining at least one longitudinal coordinate of the object z by evaluating the color information of the central components.

Embodiment 6: The detector according to the preceding embodiment, the detector is configured to determine the longitudinal coordinate $z_{DPR}$ and the longitudinal coordinate z simultaneously.

Embodiment 7: The detector according to any one of the five preceding embodiments, wherein the first optical sensor has a measurement range, wherein the evaluation device is configured for determining if the object is located within or outside the measurement range by considering the determined longitudinal coordinate $z_{DPR}$.

Embodiment 8: The detector according to the preceding embodiment, wherein, if the evaluation device has determined that the object is outside the measurement range, the evaluation device is configured to issue at least one indication that the object is outside the measurement range and/or at least one indication to adapt the distance to the object and/or at least one indication of longitudinal coordinate $z_{DPR}$, and/or wherein, if the evaluation device has determined that the object is within the measurement range, the evaluation device is configured to issue at least one indication of the longitudinal coordinate z.

Embodiment 9: The detector according to any one of the two preceding embodiments, wherein the measurement range is defined by a range from a minimum measurement distance to a maximum measurement distance, wherein the detector comprises at least one illumination source which is configured to generate at least one light beam for illuminating the object, wherein the transfer device is configured for focusing the light beam for illuminating the object at wavelength-dependent, consecutive focal points, wherein the minimum measurement distance is a distance from a light emitting area of the detector to a focal point of a wavelength λmin being closest to the light emitting area, wherein the maximum measurement distance is a distance from the light emitting area to a focal point of a wavelength λmax having the largest distance from the light emitting area.

Embodiment 10: The detector according to any of the preceding embodiments, wherein the detector comprises the at least one illumination source, wherein the illumination source is adapted to illuminate the object with at least one illumination light beam, wherein the illumination source comprises at least one polychromatic white light source.

Embodiment 11: The detector according to any one of the preceding embodiments, wherein the second optical sensor is positioned in a direction of propagation of the light beam propagating from the object to the detector in front of the aperture element.

Embodiment 12: The detector according to any one of the preceding embodiments, wherein the detector comprises at least one confocal chromatic sensor, wherein the confocal chromatic sensor comprises the first optical sensor, wherein the first optical sensor comprises at least one sensor element for determining the color information of the central components.

Embodiment 13: The detector according to the preceding embodiment, wherein the confocal chromatic sensor is a fiber optical confocal chromatic sensor comprising at least one first optical fiber, wherein the first optical fiber comprises at least one first fiber end, wherein the first fiber end is configured for emitting the at least one light beam for illuminating the object and/or to receive at least partially the central components of the light beam propagating from the object to the detector.

Embodiment 14: The detector according to the preceding embodiment, wherein the first optical fiber has at least one second fiber end, wherein the second fiber end is configured to provide light having passed through the first optical fiber to the first optical sensor.

Embodiment 15: The detector according to any one of the two preceding embodiments, wherein the detector comprises at least one second optical fiber, wherein the second optical fiber is arranged to receive at least partially the edge components, wherein the second optical fiber is configured to provide light having passed through the second optical fiber to the second optical sensor.

Embodiment 16: A method for determining a position of at least one object, wherein a detector according to any one of the preceding embodiments is used, the method comprising the following steps:

Illuminating at least one first optical sensor positioned in a direction of propagation of a light beam propagating from the object to the detector and having passed at least one transfer device with chromatic aberration behind at least one aperture element, wherein the aperture element is configured to block edge components of the light beam propagating from the object to the detector and having passed the transfer device, wherein the aperture element is configured to let pass central components of said light beam;

Determining a color information of the central components of said light beam with the first optical sensor and determining at least one first intensity information of the central components of said light beam by using the first optical sensor;

Determining at least one second intensity information of the edge components of said light beam by using at least one second optical sensor.

Embodiment 17: The method according to the preceding embodiment, wherein the method further comprises determining at least one longitudinal coordinate $z_{DPR}$ of the object by evaluating a combined signal Q from the first intensity information of the central components and the second intensity information of the edge components by using at least one evaluation device.

Embodiment 18: The method according to the preceding claim, wherein the method further comprises determining at least one longitudinal coordinate of the object z by evaluating the color information of the central components by using the evaluation device.

Embodiment 19: The method according to the preceding embodiment, wherein the determining of the longitudinal coordinate $z_{DPR}$ and the longitudinal coordinate z is performed simultaneously.

Embodiment 20: The method according to any one of the three preceding embodiments, wherein the first optical sensor has a measurement range, wherein the evaluation device is configured for determining if the object is located within or outside the measurement range by considering the determined longitudinal coordinate $z_{DPR}$.

Embodiment 21: The method according to the preceding embodiment, wherein, if it is determined that the object is outside the measurement range, the method comprises adapting the distance between the object and the detector.

Embodiment 22: A use of a detector according to any one of the preceding embodiments referring to a detector, for a purpose of use, selected from the group consisting of: metrology, factory automation, quality inspection, process automation, safety application, manufacturing application, thickness measurements, confocal chromatic microscopy.

BRIEF DESCRIPTION OF THE FIGURES

Further optional details and features of the invention are evident from the description of preferred exemplary embodiments which follows in conjunction with the dependent claims. In this context, the particular features may be implemented in an isolated fashion or in combination with other features. The invention is not restricted to the exemplary embodiments. The exemplary embodiments are shown schematically in the figures. Identical reference numerals in the individual figures refer to identical elements or elements with identical function, or elements which correspond to one another with regard to their functions.

Specifically, in the figures.

DETAILED DESCRIPTION OF THE EMBODIMENTS

Figure 1:
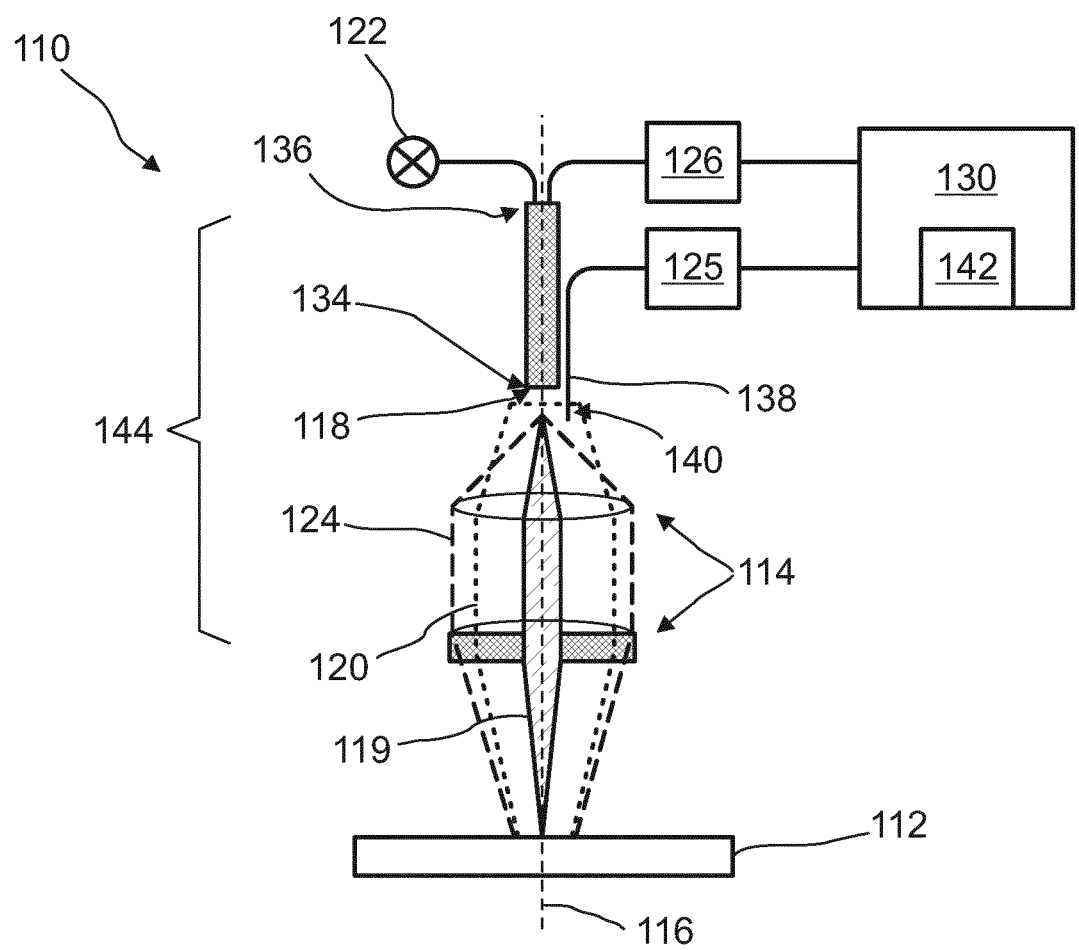
FIG. 1 shows a first exemplary embodiment of a detector for determining a position of at least one object according to the present invention.

In FIG. 1, a schematic view of a first embodiment of a detector 110 for determining a position of at least one object 112 is depicted. The object 112 may be a point like object or an extended object or region. The detector 110 comprises at least one transfer device 114 with chromatic aberration. The transfer device 114 may comprise at least one lens or lens system with chromatic aberration. The transfer device 114 may have different refractive indices for different wavelengths of light. Specifically, the transfer device 114 may be configured to focus light impinging on the transfer device at different and wavelength dependent focal points. The transfer device 114 may have different focal lengths for different wavelengths. For a transfer device with chromatic aberration the focal length may dependent on the refractive index which is wavelength dependent such that light having different wavelengths will be focused on different and wavelength dependent positions. The focal length for a wavelength may be defined as a distance from the center of the lens or lens system to the principal focal point for this wavelength.

The transfer device 114 may have an optical axis 116. In particular, the detector 110 and the transfer device 114 may have a common optical axis.

The optical axis 116 of the detector 110 may be a line of symmetry of the optical setup of the detector. The transfer device 114 may comprise at least one beam path, with the elements of the transfer device 114 in the beam path being located in a rotationally symmetrical fashion with respect to the optical axis 116. Still, one or more optical elements located within the beam path may also be off-centered or tilted with respect to the optical axis. The transfer device 114 may constitute a coordinate system, wherein a longitudinal coordinate l is a coordinate along the optical axis 116 and wherein d is a spatial offset from the optical axis 116. The coordinate system may be a polar coordinate system in which the optical axis of the transfer device forms a z-axis and in which a distance from the z-axis and a polar angle may be used as additional coordinates. A direction parallel or antiparallel to the z-axis may be considered a longitudinal direction, and a coordinate along the z-axis may be considered a longitudinal coordinate l. Any direction perpendicular to the z-axis may be considered a transversal direction, and the polar coordinate and/or the polar angle may be considered a transversal coordinate.

The detector 110 furthermore may comprise one or more of: at least one lens, for example at least one lens selected from the group consisting of at least one refractive lens, at least one focus-tunable lens, at least one aspheric lens, at least one spheric lens, at least one Fresnel lens, at least one aspheric lens; at least one diffractive optical element; at least one concave mirror; at least one beam deflection element, preferably at least one mirror; at least one semipermeable mirror; at least one beam splitting element, preferably at least one of a beam splitting cube or a beam splitting mirror; at least one multi-lens system. Additionally, the detector 110 may comprise at least one wavelength-selective element, for example at least one optical filter. Additionally, the detector 110 may comprise at least one element which is designed to impress a predefined beam profile on the electromagnetic radiation, for example, at the location of a sensor region of the optical sensors. These optional embodiments can, in principle, be realized individually or in any desired combination.

The detector 110 comprises at least one aperture element 118. The aperture element 118 is configured to block edge components of a light beam 120 propagating from the object 112 to the detector 110 and having passed the transfer device 114. The aperture element 118 is configured to let pass central components 119 of said light beam 120.

The detector 110 may comprise at least one illumination source 122. The illumination source 122 may be configured for generating at least one light beam 124. The illumination source 122 may be or may comprise at least one light source. The light source may be or may comprise at least one multiple beam light source. The illumination source 122 may be adapted to illuminate the object 112 with at least one illumination light beam. The illumination source 122 may be configured to illuminate the object 112 with a polychromatic light beam. The illumination source 122 may comprise at least one polychromatic white light source. For example, the light source may comprise at least one laser source, specifically at least one broadband laser source. The light beam 124 may comprise a plurality of wavelengths such as at least two, three or more wavelengths.

When a polychromatic illumination light beam 124 such as a white light beam is focused by the transfer device 114 on the object 112, the different wavelengths may be focused in different distances from the transfer device 114. The object 112 may reflect a focused beam component in the wavelength corresponding to an object distance and unfocussed beam components with the remaining wavelengths. The reflected light may impinge on the transfer device 114 and subsequently on the aperture element 118. The aperture element 118 may be arranged such that the reflected unfocused beam components may impinge unfocused on the aperture element 118. The aperture element 118 may be configured to block the reflected unfocused beam components. The aperture element 118 may be arranged such that the reflected focused beam components may impinge essentially focused on the aperture element. The aperture element 118 may be configured to let the reflected focused beam components pass. The central components 119 of the light beam 120 may impinge at an opening of the aperture element 118 on the aperture element 118 such as reflected focused beam components. The edge components of the light beam 120 may impinge outside the opening of the aperture element 118 on the aperture element 118 such as reflected unfocused beam components. Specifically, the aperture element 118 may be configured to let pass light having a certain degree of collimation and to block light below said degree of collimation. For example, the aperture element 118 may be configured to let only essentially focused light pass and to block unfocussed components. The transfer device 114 may have wavelength dependent focal length. The circle of confusion may depend on the focal length of the transfer device 114 and, thus, on the wavelength. Furthermore, the circle of confusion may depend on a longitudinal distance from the object 112 to the transfer device 114, a diameter of an exit pupil of the transfer device 114 and a longitudinal distance from the transfer device 114.

The detector 110 comprises at least one first optical sensor 126 positioned in a direction of propagation of the light beam 120 behind the aperture element 118. The first optical sensor 126 is configured for determining a color information of the central components 119 of the light beam 120. The first optical sensor 126 is configured for determining at least one first intensity information of the central components 119 of the light beam 120. The detector 110 comprises at least one second optical sensor 128. The second optical sensor 128 is configured to determine at least one second intensity information of the edge components of the light beam 120.

Each of the first optical sensor 126 and the second optical sensor 128 may have a light-sensitive area which in response to illumination is configured to generate at least one sensor signal. The light-sensitive area may specifically be located on a surface of the respective optical sensor. Other embodiments, however, are feasible.

The first optical sensor is positioned in a direction of propagation of the light beam propagating from the object to the detector behind the aperture element. Thus, for example, the light beam, specifically central components 119 of the light beam, propagating from the object 112 to the detector 110 may firstly impinge on the transfer device 114, subsequently on the aperture element 118 and then on the first optical sensor 126.

The first optical sensor 126 is configured for determining color information of the central components 119 of the light beam 120. The detector 110 may comprise at least one confocal chromatic sensor. Specifically, the detector 110 comprises at least one first measurement channel comprising the confocal chromatic sensor. The confocal chromatic sensor may comprise the first optical sensor 126. The first optical sensor 126 may be or may comprise at least one spectrometer device and/or at least one color analyzer. For example, the first optical sensor 126 may comprise at least one wavelength dependent prism and/or at least one spectral filter. The first optical sensor 126 may comprise at least one sensor element for determining the color information of the central components. The detector 110 may comprise at least one evaluation device 130 which is configured for determining at least one longitudinal coordinate z of the object 112 by evaluating the color information. The object distance may be given by a correspondence between the longitudinal coordinate z and the wavelength. Each wavelength of the intensity distribution may correspond to one longitudinal coordinate z of the object 112. Relationship between the wavelength and the longitudinal coordinate z may be predetermined such as during a calibration process. The intensity distribution may comprise a maximum which corresponds to the wavelength having the focal point at the position of the aperture element, in particular which corresponds to the wavelength of the reflected focused beam components. Other wavelengths may generate attenuated signals on the first optical sensor 126. The evaluation device 130 may be configured to determine the maximum of the intensity distribution. The evaluation device 130 may be configured to determine the wavelength at the maximum of the intensity distribution and to determine therefrom the longitudinal coordinate of the object 112.

In the embodiment of FIG. 1, the confocal chromatic sensor may be a fiber optical confocal chromatic sensor comprising at least one first optical fiber 132. The first optical fiber 132 may be adapted to transmit at least parts of the incident light beam which are not absorbed and/or reflected, between two ends of the first optical fiber 132. The first optical fiber 132 may have a length and may be adapted to permit transmission over a distance. The first optical fiber 132 may comprise at least one material selected from the group consisting of: silica, aluminosilicate glass, germane silicate glass, fluorozirconate, rare earth doped glass, fluoride glass, chalcogenide glasses, sapphire, doped variants, especially for silica glass, phosphate glass, PMMA, polystyrene, fluoropolymers such as poly(perfluoro-butenylvinyl ether), or the like. The first optical fiber 132 may be a single or multi-mode fiber. The first optical fiber 132 may be a step index fiber, a polarizing fiber, a polarization maintaining fiber, a plastic optical fiber, a glass optical fiber, or the like. The first optical fiber 132 may comprise at least one fiber core which is surrounded by at least one fiber cladding having a lower index of refraction as the fiber core. The fiber cladding may also be a double or multiple cladding. The fiber cladding may comprise a so-called outer jacket. The fiber cladding may be coated by a so-called buffer adapted to protect the optical fiber from damages and moisture. The buffer may comprise at least one UV-cured urethane acrylate composite and/or at least one polyimide material. In one embodiment, a refractive index of the fiber core may be higher than the refractive index of the fiber cladding material and the optical fiber may be adapted to guide the incoming light beam by total internal reflection below the angle of acceptance. In one embodiment, the first optical fiber 132 may comprise at least one hollow core fiber, also called photonic bandgap fiber. The hollow-core fiber may be adapted to guide the incoming light beam essentially within a so-called hollow region, wherein a minor portion of the light beam is lost due to propagation into the fiber cladding material.

The first optical fiber 132 may comprise at least one first fiber end 134. The first fiber end 134 may be configured for emitting the at least one light beam 124 for illuminating the object 112 and/or to receive at least partially the central components 119 of the light beam 120 propagating from the object 112 to the detector 110. The illumination source 122 may be configured to couple the light beam 124 into the first optical fiber 132. In this embodiment, the aperture of the first optical fiber 132 may be designed as the aperture element 118 which is configured to block the edge components, in particular unfocussed light, and to let pass the central components 119. Thus, the illumination light beam 124 and the light beam 120 reflected by the object 112 may be coupled and transmitted through the same fiber. The first optical fiber 132 may have at least one second fiber end 136. The second fiber end 136 may be configured to provide light having passed through the first optical fiber 132 to the first optical sensor 126.

The first optical sensor 126 is configured for determining the at least one first intensity information of the central components of the light beam 120 propagating from the object 112 to the detector 110. The first optical sensor 126 is positioned in a direction of propagation of the light beam 120 propagating from the object 112 to the detector 110 behind the aperture element 118. Thus, the edge components of the light beam 120 propagating from the object 112 to the detector 110 may be blocked by the aperture element 118 and only the central components 119 pass through the aperture element 118 to the first optical sensor 126. For example, in the embodiment of FIG. 1, the first optical sensor 126 may be positioned at the second end 136 of the first optical fiber 132. The first optical sensor 126 may comprise the at least one light-sensitive area which in response to illumination generates the at least one sensor signal. The sensor signal may depend on the intensity of a light spot generated by the light beam impinging on the light-sensitive area. The light spot generated on the light-sensitive area may have a round or non-round shape.

The second optical sensor 128 is configured to determine at least one second intensity information of the edge components of the light beam 120 propagating from the object 112 to the detector 110. The second optical sensor 128 may be positioned in a direction of propagation of the light beam 120 propagating from the object 112 to the detector 110 in front of the aperture element 118. Thus, the second optical sensor 128 may be position such that the edge components of the light beam 120 propagating from the object 112 to the detector 110 can at least partially reach the second optical sensor 128. For example, in the embodiment shown in FIG. 1, the detector 110 may comprise at least one second optical fiber 138. The second optical fiber 138 may be arranged to receive at least partially the edge components. For example, the second optical fiber 138 may comprise a receiving end 140. The receiving end 140 may be positioned in a direction of propagation of the light beam 120 propagating from the object 112 to the detector 110 in front of the aperture element 118. The second optical fiber 138 may be configured to provide light having passed through the second optical fiber 138 to the second optical sensor 128. The second optical sensor 128 may be positioned at a further end of the second optical fiber 138. The second optical sensor 128 may comprise the at least one light-sensitive area which in response to illumination generates the at least one sensor signal. The sensor signal may depend on the intensity of a light spot generated by the light beam impinging on the light-sensitive area.

One or both of the first optical sensor 126 and the second optical sensor 128 may comprise a sensor element having a matrix of pixels. The sensor element may be formed as a unitary, single device or as a combination of several devices. The matrix, specifically, may be or may comprise a rectangular matrix having one or more rows and one or more columns. The rows and columns specifically may be arranged in a rectangular fashion. It shall be outlined, however, that other arrangements are feasible, such as nonrectangular arrangements. As an example, circular arrangements are also feasible, wherein the elements are arranged in concentric circles or ellipses about a center point. For example, the matrix may be a single row of pixels. Other arrangements are feasible. The light-sensitive areas of the pixels of the matrix specifically may be equal in one or more of size, sensitivity and other optical, electrical and mechanical properties. The light-sensitive areas of all pixels of the matrix specifically may be located in a common plane, the common plane preferably facing the object, such that a light beam 120 propagating from the object 112 to the detector 110 may generate a light spot on the common plane. The first optical sensor 126 and the second optical sensor 128 may have light-sensitive areas having an identical size or may have light-sensitive areas having different size.

Each of the first optical sensor 126 and the second optical sensor 128 may be configured to generate at least one sensor signal, such as at least one output signal, in response to illumination of its light-sensitive area. One or both of the first optical sensor 126 and the second optical sensor 128, for example, may comprise one or more of at least one bi-cell diode, at least one quadrant diode; at least one CCD chip, at least one CMOS chip. Specifically, the sensor signal may be or may comprise at least one electrical signal, such as at least one analogue electrical signal and/or at least one digital electrical signal. More specifically, the sensor signal may be or may comprise at least one voltage signal and/or at least one current signal. More specifically, the sensor signal may comprise at least one photocurrent. Further, either raw sensor signals may be used, or the detector, the optical sensor or any other element may be adapted to process or preprocess the sensor signal, thereby generating secondary sensor signals, which may also be used as sensor signals, such as preprocessing by filtering or the like.

One or both of the first optical sensor 126 and the second optical sensor 128 may be sensitive in one or more of the ultraviolet, the visible or the infrared spectral range. Specifically, one or both of the first optical sensor 126 and the second optical sensor 128 may be sensitive in the visible spectral range from 400 nm to 780 nm, most preferably at 650 nm to 750 nm. Specifically, one or both of the first optical sensor 126 and the second optical sensor 128 may be sensitive in the near infrared region. Specifically, one or both of the first optical sensor 126 and the second optical sensor 128 may be sensitive in the part of the near infrared region where silicon photodiodes are applicable specifically in the range of 700 nm to 1000 nm. One or both of the first optical sensor 126 and the second optical sensor 128, specifically, may be sensitive in the infrared spectral range, specifically in the range of 780 nm to 3.0 micrometers. For example, one or both of the first optical sensor 126 and the second optical sensor 128, independently, may be or may comprise at least one element selected from the group consisting of a photodiode, a photocell, a photoconductor, a phototransistor or any combination thereof. For example, one or both of the first optical sensor 126 and the second optical sensor 128 may be or may comprise at least one element selected from the group consisting of a CCD sensor element, a CMOS sensor element, a photodiode, a photocell, a photoconductor, a phototransistor or any combination thereof. Any other type of photosensitive element may be used. The photosensitive element generally may fully or partially be made of inorganic materials and/or may fully or partially be made of organic materials. Most commonly, as will be outlined in further detail below, one or more photodiodes may be used, such as commercially available photodiodes, e.g. inorganic semiconductor photodiodes. Specifically, the photosensitive element may be or may comprise at least one element selected from the group consisting of a photodiode, a photocell, a photoconductor, a phototransistor or any combination thereof. Any other type of photosensitive element may be used.

One or both of the first optical sensor 126 and the second optical sensor 128 specifically may be semiconductor sensors, preferably inorganic semiconductor sensors, more preferably photodiodes and most preferably silicon photodiodes. Specifically, one or both of the first optical sensor 126 and the second optical sensor 128 may be or may comprise inorganic photodiodes which are sensitive in the infrared spectral range, preferably in the range of 780 nm to 3.0 micrometers, and/or sensitive in the visible spectral range, preferably in the range of 380 nm to 780 nm. Specifically, one or both of the first optical sensor 126 and the second optical sensor 128 may be sensitive in the part of the near infrared region where silicon photodiodes are applicable specifically in the range of 700 nm to 1000 nm. Infrared optical sensors which may be used for the optical sensor may be commercially available infrared optical sensors, such as infrared optical sensors commercially available under the brand name Hertzstueck™ from trinamiX GmbH, D-67056 Ludwigshafen am Rhein, Germany. Thus, as an example, one or both of the first optical sensor 126 and the second optical sensor 128 may comprise at least one optical sensor of an intrinsic photovoltaic type, more preferably at least one semiconductor photodiode selected from the group consisting of: a Ge photodiode, an InGaAs photodiode, an extended InGaAs photodiode, an InAs photodiode, an InSb photodiode, a HgCdTe photodiode. Additionally or alternatively, one or both of the optical sensors may comprise at least one optical sensor of an extrinsic photovoltaic type, more preferably at least one semiconductor photodiode selected from the group consisting of: a Ge:Au photodiode, a Ge:Hg photodiode, a Ge:Cu photodiode, a Ge:Zn photodiode, a Si:Ga photodiode, a Si:As photodiode. Additionally or alternatively, one or both of the first optical sensor 126 and the second optical sensor 128 may comprise at least one at least one photoconductive sensor such as a PbS or PbSe sensor, a bolometer, preferably a bolometer selected from the group consisting of a VO bolometer and an amorphous Si bolometer. One or both of the optical sensors may be opaque, transparent or semitransparent. For the sake of simplicity, however, opaque sensors which are not transparent for the light beam, may be used, since these opaque sensors generally are widely commercially available.

The detector 110 may comprise the at least one evaluation device 130 being configured for determining at least one longitudinal coordinate $z_{DPR}$ of the object 112 by evaluating a combined signal Q from the first intensity information of the central components and the second intensity information of the edge components. The evaluation device 130 may comprise one or more of at least one data processing device, at least one processor, at least one application-specific integrated circuit. Thus, as an example, the at least one evaluation device 130 may comprise at least one data processing device having a software code stored thereon comprising a number of computer commands. The evaluation device 130 may provide one or more hardware elements for performing one or more of the named operations and/or may provide one or more processors with software running thereon for performing one or more of the named operations.

The evaluation device 130 may be configured for generating the output based on the distance by photon ratio (DPR) technique which is described e.g. in WO 2018/091649 A1, WO 2018/091638 A1 and WO 2018/091640, the content of which is included by reference. The DPR technique allows distance measurements such as determining a longitudinal coordinate of the object. In addition, the DPR technique also allows recognizing geometrical changes to the light beam upon traversing the area of surveillance such as partial coverage of the light beam. The combined signal Q may be derived by one or more of: forming a quotient of the first intensity information of the central components 119 and the second intensity information of the edge components; forming a quotient of a multiples of the first intensity information of the central components 119 and the second intensity information of the edge components; forming a quotient of linear combinations of the first intensity information of the central components 119 and the second intensity information of the edge components; forming a quotient of a linear combination of the first intensity information of the central components 119 and the second intensity information of the edge components. The combined signal Q may be determined by using various means. As an example, a software means for deriving the combined signal, a hardware means for deriving the combined signal, or both, may be used and may be implemented in the evaluation device. Thus, the evaluation device 130, as an example, may comprise at least one divider 142, wherein the divider is configured for deriving the quotient signal. The divider 142 may fully or partially be embodied as one or both of a software divider or a hardware divider.

For example, the evaluation device 130 may be configured for deriving the combined signal Q by $$Q(z_O) = \frac{\int\int_{A_1} E(x, y; z_O) dx dy}{\int\int_{A_2} E(x, y; z_O) dx dy}$$

wherein x and y are transversal coordinates, A1 and A2 are areas of the beam profile of the light beam at the position of the first optical sensor 126 and the second optical sensor 128, respectively, and $E(x,y,z_o)$ denotes the beam profile for the distance of the object $z_o$. Area A1 and area A2 may differ. In particular, A1 and A2 are not congruent. Thus, A1 and A2 may differ in one or more of the shape or content. The beam profile may be a cross section of the light beam. The beam profile may be selected from the group consisting of a trapezoid beam profile; a triangle beam profile; a conical beam profile and a linear combination of Gaussian beam profiles.

The sensor signals of the first optical sensor 126 and the second optical sensors 128 each may comprise information of at least one area of the beam profile of the light beam. The first area of the beam profile and second area of the beam profile may be one or both of adjacent or overlapping regions. The first area of the beam profile and the second area of the beam profile may be not congruent in area. The first area of the beam profile may comprise essentially edge information of the beam profile and the second area of the beam profile may comprise essentially center information of the beam profile. The first area of the beam profile may be area A2 and the second area of the beam profile may be area A1. The edge information may comprise information relating to a number of photons in the first area of the beam profile and the center information may comprise information relating to a number of photons in the second area of the beam profile. For example, the evaluation device 130 may be adapted for determining the edge information by determining an area integral of the beam profile of the first area. The evaluation device 130 may be adapted to determine the edge information by determining the edge information by integrating and/or summing of the first area. The evaluation device 130 may be adapted to determine the center information by integrating and/or summing of the second area. The evaluation device 130 may be configured to derive the combined signal Q by one or more of dividing the edge information and the center information, dividing multiples of the edge information and the center information, dividing linear combinations of the edge information and the center information. Thus, essentially, photon ratios may be used as the physical basis of the method.

As an example, Q may simply be determined as Q=s1/s2 or Q=s2/s1, with s1 denoting the sensor signal of the first optical sensor 126 and s2 denoting the sensor signal of the second optical sensor 128. Additionally or alternatively, Q may be determined as Q=a·s1/b·s2 or Q=b·s2/a·s1, with a and b being real numbers which, as an example, may be predetermined or determinable. Additionally or alternatively, Q may be determined as Q=(a·s1+b·s2)/(c·s1+d·s2), with a, b, c and d being real numbers which, as an example, may be predetermined or determinable. As a simple example for the latter, Q may be determined as Q=s1/(s1+s2). Other combined signals are feasible.

The evaluation device 130 may be configured for using at least one predetermined relationship between the combined signal Q and the longitudinal coordinate $z_{DPR}$ for determining the longitudinal coordinate $z_{DPR}$. The predetermined relationship may be one or more of an empiric relationship, a semi-empiric relationship and an analytically derived relationship. The evaluation device 130 may comprise at least one data storage device for storing the predetermined relationship, such as a lookup list or a lookup table. The determining of the at least one longitudinal coordinate $z_{DPR}$ may be performed by the at least one evaluation device 130. Thus, as an example, the relationship may be implemented in software and/or hardware, such as by implementing one or more lookup tables. Thus, as an example, the evaluation device 130 may comprise one or more programmable devices such as one or more computers, application-specific integrated circuits (ASICs), Digital Signal Processors (DSPs), or Field Programmable Gate Arrays (FPGAs) which are configured to perform the above-mentioned evaluation, in order to determine the at least one longitudinal coordinate $z_{DPR}$. Additionally or alternatively, however, the evaluation device 130 may also fully or partially be embodied by hardware.

As outlined above, the evaluation device 130 may be configured for determining at least one longitudinal coordinate z of the object 112 by evaluating the color information of the central components 119. In addition, the evaluation device 130 may be configured to determine the longitudinal coordinate $z_{DPR}$. The detector 110 may be configured to determine the longitudinal coordinate $z_{DPR}$ and the longitudinal coordinate z simultaneously such as in two measurement channels.

The detector 110 may comprise at least one measuring head 144. The measuring head 144 may comprise the at least one first fiber end 134 of the first optical fiber 132 and/or the receiving end 140 of the second optical fiber 138. The first optical fiber 132 and the second optical fiber 138 may serve as transport medium for the signals only. Thus, the first optical fiber 132 and the second optical fiber 138 may be connected to the vacuum feedthrough and/or may be designed for high temperatures and/or rough chemical environments.

Figure 2:
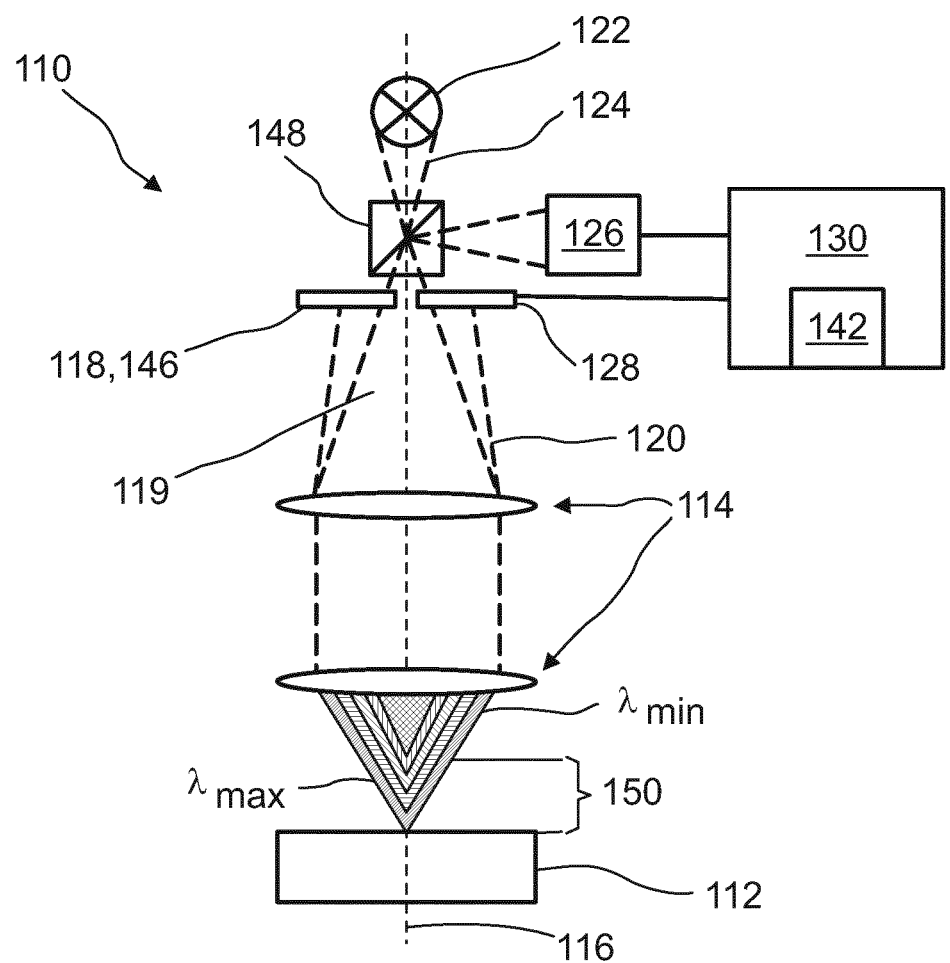
FIG. 2 shows a second exemplary embodiment of the detector.

FIG. 2 shows a further embodiment of the detector 110. In this embodiment the aperture element 118 may comprise at least one aperture stop 146. The aperture element 118 may have at least one opening such as at least one hole. The first optical sensor 126 may be positioned behind the aperture stop 146. The detector 110 may further comprise at least one beam splitter 148, wherein the beam splitter 148 may be configured to guide the illumination beam 124 generated by the illumination source 122 to the aperture stop 146 and to guide the reflected light beam 120 to the first optical sensor 126. The second optical sensor 128 may be positioned in a direction of propagation of the light beam 120 propagating from the object 112 to the detector 110 in front the aperture element 118 and/or on the aperture element 118 and/or monolithic with the aperture element 118. Schematically an active area of the second optical sensor 128 is shown in FIG.

2. With respect to further description of the detector 110 reference is made to the description of FIG. 1.

The first optical sensor 126 may have a measurement range 150. The measurement range 150 may be defined by a range from a minimum measurement distance to a maximum measurement distance. The detector 110 may comprise the at least one illumination source 122 which is configured to generate the at least one light beam 124 for illuminating the object 112. The transfer device 114 may be configured for focusing the light beam 124 for illuminating the object 112 at wavelength-dependent, consecutive focal points. The minimum measurement distance may be a distance from a light emitting area of the detector 110 to a focal point of a wavelength $\lambda_{min}$ being closest to the light emitting area. The maximum measurement distance may be a distance from the light emitting area to a focal point of a wavelength $\lambda_{max}$ having the largest distance from the light emitting area. Usually confocal chromatic sensors are not able to deliver measurement values if the object is outside the measurement range. In conventional confocal chromatic sensors it can be a challenge to find the measurement range of the sensor, especially in fully automated processes. The detector 110 according to the present invention may allow determining whether the object is within the measurement range 150. The evaluation device 130 may be configured for determining if the object 112 is located within or outside the measurement range 150 by considering the determined longitudinal coordinate $z_{DPR}$. The evaluation device 130 may be configured for determining whether the determined longitudinal coordinate $z_{DPR}$ lies within the measurement range 150. If the evaluation device 130 has determined that the object 112 is outside the measurement range 150, the evaluation device 130 may be configured to issue at least one indication that the object 112 is outside the measurement range and/or at least one indication to adapt the distance to the object 112 and/or at least one indication of longitudinal coordinate $z_{DPR}$. If the evaluation device 130 has determined that the object 112 is within the measurement range 150, the evaluation device 130 may be configured to issue at least one indication of the longitudinal coordinate z. Thus, the detector 110 according to the present invention may combine distance measurement using the DPR technology and confocal chromatic sensing. The DPR measurement can be used to determine an indication of the distance to the object 112, such as a less accurate measurement compared to the confocal chromatic measurement, in order to determine the measurement range 150 of the confocal chromatic sensor. Moreover, the DPR technique may allow extension of the measurement range 150 of the confocal chromatic sensor since it may allow distance determination even outside the measurement range 150 of the confocal chromatic sensor.

LIST OF REFERENCE NUMBERS 110 detector
112 object
114 transfer device
116 optical axis
118 aperture element
119 central components
120 light beam
122 illumination source
124 light beam
126 first optical sensor
128 second optical sensor
130 evaluation device
132 first optical fiber
134 first fiber end
136 second fiber end
138 second optical fiber
140 receiving end
142 divider
144 measuring head
146 aperture stop
148 beam splitter
150 measurement range

The invention claimed is:

1. A detector for determining a position of at least one object, the detector comprising:
   at least one transfer device with chromatic aberration;
   at least one aperture element, wherein the aperture element is configured to block edge components of a light beam propagating from the object to the detector and having passed the transfer device, wherein the aperture element is configured to let pass central components of said light beam;
   at least one first optical sensor positioned in a direction of propagation of said light beam behind the aperture element, wherein the first optical sensor is configured for determining a color information of the central components of said light beam and wherein the first optical sensor is configured for determining at least one first intensity information of the central components of said light beam; and
   at least one second optical sensor, wherein the second optical sensor is configured to determine at least one second intensity information of the edge components of said light beam,
   wherein the detector comprises at least one evaluation device being configured for determining at least one longitudinal coordinate $z_{DPR}$ of the object by evaluating a combined signal Q from the first intensity information of the central components and the second intensity information of the edge components.

2. The detector according to claim 1, wherein the evaluation device is configured for using at least one predetermined relationship between the combined signal Q and the longitudinal coordinate $z_{DPR}$ of the object for determining the longitudinal coordinate $z_{DPR}$.

3. The detector according to claim 1, wherein the combined signal Q is derived by forming a quotient of the first intensity information of the central components and the second intensity information of the edge components; forming a quotient of multiples of the first intensity information of the central components and the second intensity information of the edge components; forming a quotient of linear combinations of the first intensity information of the central components and the second intensity information of the edge components; and/or forming a quotient of a linear combination of the first intensity information of the central components and the second intensity information of the edge components.

4. The detector according to claim 1, wherein the evaluation device is configured for determining at least one longitudinal coordinate z of the object by evaluating the color information of the central components.

5. The detector according to claim 1, wherein the first optical sensor has a measurement range, wherein the evaluation device is configured for determining if the object is located within or outside the measurement range by considering the determined longitudinal coordinate $z_{DPR}$.

6. The detector according to claim 5, wherein, if the evaluation device has determined that the object is outside the measurement range, the evaluation device is configured to issue at least one indication that the object is outside the measurement range and/or at least one indication to adapt a distance to the object and/or at least one indication of longitudinal coordinate $z_{DPR}$, and/or wherein, if the evaluation device has determined that the object is within the measurement range, the evaluation device is configured to issue at least one indication of the longitudinal coordinate z.

7. The detector according to claim 1, wherein the detector comprises the at least one illumination source, wherein the illumination source is adapted to illuminate the object with at least one illumination light beam, wherein the illumination source comprises at least one polychromatic white light source.

8. The detector according to claim 1, wherein the second optical sensor is positioned in a direction of propagation of the light beam propagating from the object to the detector in front of the aperture element.

9. The detector according to claim 1, wherein the detector comprises at least one confocal chromatic sensor, wherein the confocal chromatic sensor comprises the first optical sensor, wherein the first optical sensor comprises at least one sensor element for determining the color information of the central components.

10. The detector according to claim 9, wherein the confocal chromatic sensor is a fiber optical confocal chromatic sensor comprising at least one first optical fiber, wherein the first optical fiber comprises at least one first fiber end, wherein the first fiber end is configured for emitting at least one light beam for illuminating the object and/or to receive at least partially the central components of the light beam propagating from the object to the detector, wherein the first optical fiber has at least one second fiber end, wherein the second fiber end is configured to provide light having passed through the first optical fiber to the first optical sensor.

11. The detector according to claim 10, wherein the detector comprises at least one second optical fiber, wherein the second optical fiber is arranged to receive at least partially the edge components, wherein the second optical fiber is configured to provide light having passed through the second optical fiber to the second optical sensor.

12. A method for determining a position of at least one object, wherein a detector according to claim 1 is used, the method comprising the following steps:
  illuminating at least one first optical sensor positioned in a direction of propagation of a light beam propagating from the object to the detector and having passed at least one transfer device with chromatic aberration behind at least one aperture element, wherein the aperture element is configured to block edge components of the light beam propagating from the object to the detector and having passed the transfer device, wherein the aperture element is configured to let pass central components of said light beam;
  determining a color information of the central components of said light beam with the first optical sensor and determining at least one first intensity information of the central components of said light beam by using the first optical sensor; and
  determining at least one second intensity information of the edge components of said light beam by using at least one second optical sensor;
  wherein the method further comprises determining at least one longitudinal coordinate $z_{DPR}$ of the object by evaluating a combined signal Q from the first intensity information of the central components and the second intensity information of the edge components by using at least one evaluation device.

13. The method according to claim 12, wherein the method further comprises determining at least one longitudinal coordinate z of the object by evaluating the color information of the central components by using the evaluation device.

14. The method according to claim 12, wherein the first optical sensor has a measurement range, wherein the evaluation device is configured for determining if the object is located within or outside the measurement range by considering the determined longitudinal coordinate $z_{DPR}$, wherein, if it is determined that the object is outside the measurement range, the method comprises adapting a distance between the object and the detector.

* * * * *